W. E. BROUGHTON.
CLUTCH MECHANISM.
APPLICATION FILED MAY 13, 1915.
1,165,066.
Patented Dec. 21, 1915.
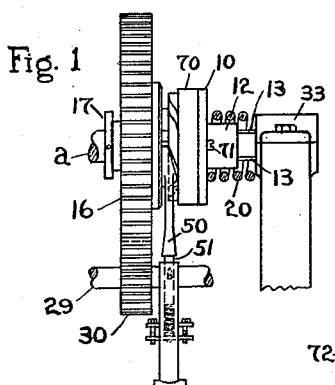
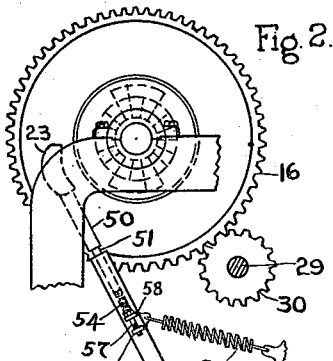
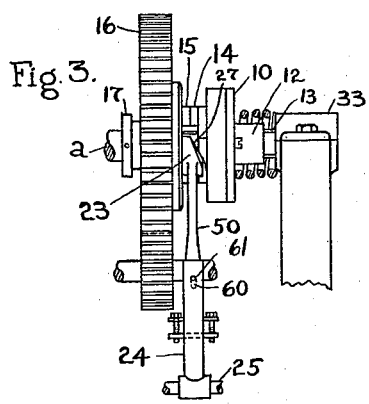
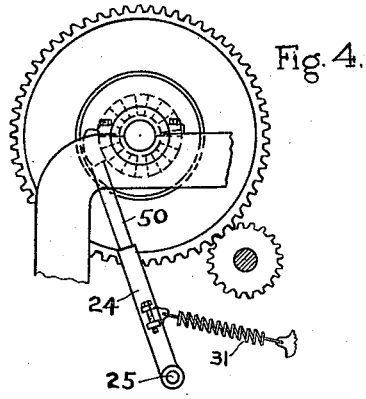
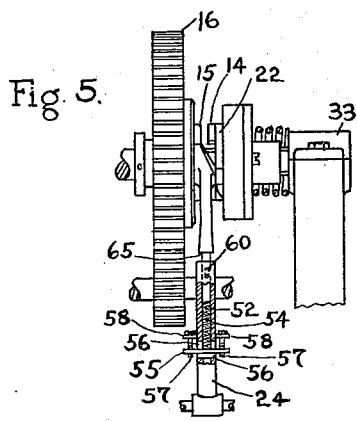
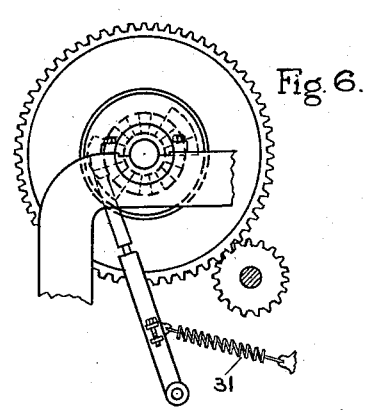
INVENTOR
Wm E. Broughton
by Jas. H. Churchill
Atty.

UNITED STATES PATENT OFFICE.

WINN E. BROUGHTON, OF PEABODY, MASSACHUSETTS, ASSIGNOR TO THE TURNER TANNING MACHINERY COMPANY, OF PEABODY, MASSACHUSETTS, A CORPORATION OF MAINE.

CLUTCH MECHANISM.

1,165,066.  Specification of Letters Patent.  Patented Dec. 21, 1915.

Application filed May 13, 1915. Serial No. 27,951.

*To all whom it may concern:*

Be it known that I, WINN E. BROUGHTON, a citizen of the United States, residing in Peabody, in the county of Essex and State of Massachusetts, have invented an Improvement in Clutch Mechanism, of which the following description, in connection with the accompanying drawings, is a specification, like characters on the drawings representing like parts.

This invention relates to a clutch mechanism for controlling the rotation of a shaft, and of that character in which both members of the clutch are mounted upon the shaft, and one of which is secured to the shaft to rotate therewith and to slide thereon, and the other of which is mounted to turn freely on said shaft.

The clutch members are normally disengaged by a device which is interposed between them and is capable of being withdrawn to permit the clutch members to be engaged by a spring or other device which acts on the clutch member which is movable longitudinally on the shaft.

The present invention has for its object to improve the clutch mechanism of the character described, so as to increase its efficiency and prolong the life of the same, and also to render it substantially silent in operation.

The particular features of the invention will be pointed out in the claims at the end of this specification.

Figure 1 is a side elevation of one form of clutch mechanism embodying this invention, with the members thereof in their operative position. Fig. 2, an end elevation of the clutch mechanism shown in Fig. 1. Fig. 3, a side elevation with the clutch members in their disengaged or inoperative position. Fig. 4, an end elevation of Fig. 3. Fig. 5, a side elevation with the clutch members in their inoperative position but more widely separated than in Fig. 3. Fig. 6, an end elevation of Fig. 5, and Fig. 7, an end elevation of the sliding clutch member shown in Figs. 1 to 6.

Referring to the drawings, *a* represents a shaft whose rotation is to be controlled by a clutch mechanism embodying this invention, which comprises a member normally loose on the shaft *a* and a coöperating member which is keyed or otherwise secured to the said shaft to move longitudinally thereon. The member which is keyed to the shaft *a* is shown as a disk 10 having a hub 12, which is secured to the shaft *a* by keys 13, and in the present instance the disk 10 is provided on its front face with a plurality of lugs, projections or teeth 14, which are adapted to be engaged with corresponding lugs, projections or teeth 15 on the face of a normally loose coöperating clutch member, which is herein shown as a gear 16 mounted on the shaft *a* to turn freely thereon, but is held from longitudinal movement on said shaft in any suitable manner, as for instance by a collar 17. For sake of clearness, the disk 10 may be termed the movable member of the clutch, and the gear 16, the stationary or fixed member thereof.

The movable clutch member 10 is automatically engaged with its coöperating member 16, as herein shown, by a spring 20, and is disengaged therefrom by a device which coöperates with a cam carried by said movable clutch member. In the present instance, the clutch member 10 is provided on its front face with two cams spaced apart and each comprising an inclined end 21 of a circular flange 22, and the device with which the cams coöperate is shown as a wedge-shaped head 23 on the end of a crank or lever 24 fast on a rock shaft 25, which may be operated in any suitable manner, as for instance by a foot treadle (not shown) or otherwise, in a manner well understood.

The head 23 is provided as herein shown with a beveled or inclined surface 27, which coöperates with the inclined end surface 21 of the flange 22. The movable clutch member 10 is held in its disengaged position shown in Fig. 5, by the side of the head 23, engaging the outer face of the flange 22.

The head 23 is withdrawn from engagement with the flange 22 by rocking the shaft 25, which leaves the clutch member 10 free to be moved by the spring 20 into engagement with the fixed clutch member 16 as shown in Fig. 1, and thereby couple the latter with the shaft *a* so as to rotate the same. The gear 16 may be driven continuously from a shaft 29 by a pinion 30 thereon, and the shaft 29 may be driven in any suitable manner.

The operation of the clutch mechanism may be briefly described as follows. The clutch member 10 is normally disengaged from the member 16 by the head 23 on the crank or lever 24 which is interposed between the clutch members by a spring 31 and engages the flange 22, see Figs. 4 and 6, the spring 20 being at such time compressed against the bearing box 33 for the shaft $a$. When it is desired to set the shaft $a$ in motion, the lever or crank 24 is moved so as to withdraw the head 23 from between the clutch members and out of engagement with the flange 22 and into substantially the position shown in Figs. 1 and 2, thereby allowing the spring 20 to move the clutch member 10 toward the clutch member 16 and cause the teeth 14 on the member 10 to engage the teeth 15 on the member 16. As soon as the clutch members are engaged, the shaft $a$ is set in motion and will continue to rotate as long as the crank or lever 22 is disengaged therefrom. When it is desired to stop the shaft $a$, the crank or lever 24 is released, so as to permit the spring 31 to move its head 23 between the clutch members and thus bring the inclined surface 27 of the head 23 into the path of movement of the cam or inclined end 21 of the flange 22, so that, on the continued rotation of the shaft $a$, the inclined surface 27 of the head coöperates with the inclined end or cam 21 to move the clutch member 10 away from the clutch member 16, and as soon as the teeth 14 are disengaged from the teeth 15, the clutch member 16 is rendered loose on the shaft $a$, and the latter is stopped. As soon as the teeth 14 on the clutch member 10 are disengaged from the teeth 15 on the clutch member 16 so that they just clear, as represented in Fig. 3, power is no longer transmitted from the clutch member 16 to the shaft $a$.

Inasmuch as the clutch member 10 is backed up by the spring 20, the latter presses the clutch member 10 forward at all times, and there is liability of the front end of the teeth 14 striking the teeth 15, especially as the parts wear away in use, and while the engagement is not sufficient to effect movement of the clutch member 10 and the shaft $a$, these parts are subjected to wear, and a disagreeable clicking noise is also created. To avoid these disagreeable features, the disengaging lever or crank 24 is provided with a movable part 50 to which the head 23 is attached, so that after the clutch members have been initially separated so as to stop rotation of the shaft $a$, they may be further separated to prevent undue wear and noise.

In the present instance the upper part 50 of the lever or crank is provided with a reduced lower portion 51, which enters a socket 52 in the crank or lever 24, and is acted upon by a spring 54 within said socket, said spring resting on a cross bar 55, which is passed through slots 56 in the lever 24 and is supported by bolts 57 from lugs or ears 58 attached to the crank or lever 24. The bolts 57 extend loosely through the lugs 58. The movable part or member 50 is guided in its movement in the socket 52 by a pin 60 attached to the member 50 and extended into a slot 61 in the lever or crank 24.

When the crank or lever 24 is in its inoperative position with its head or cam 23 removed from engagement with the flange 22, as represented in Figs. 1 and 2, the spring 54 is free to move the member 50 partially out of its socket or until the stop pin 60 is engaged with the upper end wall of the slot 61.

When the crank or lever 24 is moved into its operative position between the clutch members, the head 23 is engaged by the cam or inclined end 21 of the flange 22, and the movable part 50 of the crank or lever 24 is moved into its socket 52 against the action of the spring 54, until the shoulder 65 on the member 50 engages the end of the crank or lever 24, whereupon the crank or lever acts as a one piece crank or lever and its head 23 acts to disengage the clutch member 10 from the clutch member 16 and stop rotation of the shaft $a$ as represented in Figs. 3 and 4. As soon as the shaft $a$ is stopped, the spring 54 acts and moves the upper member 50 partially out of its socket and causes the cam or head 23 to move the clutch member 10 still farther away from the clutch member 16 and thus separate the teeth a sufficient distance to prevent contact of the same under the influence of the spring 20 and thus avoid noise and wear. By reference to Fig. 3, it will be seen that the inclined surface 21 of the flange 22 is not engaged with the side of the head 23, but with a portion of the inclined side 27 thereof, which is narrower than the full width of the head, and while this position of the inclined surface 21 is sufficient to stop the shaft $a$, it is not sufficient to avoid the click or noise and the wear on the clutch teeth, but when the spring 54 acts, the head 23 is advanced so that its full width is engaged with the cam 22 on the clutch member 10, and the latter is moved back against the action of the spring 20, so as to obtain a substantially wide clearance between the teeth as represented in Fig. 5.

In the present instance, the clutch member 10 is provided with two cams or flanges 22 suitably spaced apart and located substantially diametrically opposite, so that the shaft $a$ may be stopped at each half revolution, which is desirable in some classes of machines, but it is not desired to limit the invention to the particular number of cams employed, as in most machines a single cam will suffice. Provision is made for adjusting the cams 22 with relation to the head 23 in the operative position of the latter, and for this purpose, the clutch member 10 is provided with a rotatable face plate or member 70, which is adjustable on the member 10, by means of set screws 71 carried by the face plate 70 and extended through curved slots 72 in the member 10, see Fig. 7, which slots are concentric with the shaft a. In the present instance, the clutch member 16 is shown as a gear, but it will be understood that it is not desired to limit the invention to this particular form of clutch member.

Claims:

1. In combination, a rotatable shaft, a clutch controlling rotation of said shaft and provided with coöperating members, one of which is movable toward and from the other, a cam rotatable with one of said clutch members, and a device having a spring-actuated movable member coöperating with said cam to effect a step by step movement of the movable clutch member away from its coöperating member.

2. In combination, a rotatable shaft, a clutch controlling rotation of said shaft and comprising coöperating members provided on their adjacent faces with coöperating teeth, and one of which is movable toward and from the other, means for moving said movable clutch member into engagement with its coöperating member, a device movable toward and from said clutch members and between the same and provided with a movable member and with a spring to actuate said movable member, and means carried by one of said clutch members and coöperating with said device to move the movable member of the latter in opposition to its spring and cause the device to act on said means as one piece to initially separate the clutch members, and thereafter to be moved by the said spring to act on said means and further separate said clutch members.

3. In combination, a rotatable shaft, a clutch for controlling rotation of the same and comprising coöperating members, one of which is movable toward the other, means for moving said movable clutch member into engagement with its coöperating member, and a device for separating said clutch members, said device having a movable member which is capable of being inserted between said clutch members and acts to initially separate the clutch members to stop rotation of said shaft and thereafter to further separate said clutch members, for the purpose specified.

4. In combination, a rotatable shaft, a clutch for controlling rotation of the same and comprising coöperating members, one of which is movable toward the other, means for moving said movable clutch member into engagement with its coöperating member, a lever to separate said clutch members, said lever having a spring actuated part to separate the clutch members a greater distance after they have been separated sufficiently to stop rotation of said shaft and a cam on said movable clutch member coöperating with the spring-actuated part of said lever.

5. In combination, a rotatable shaft, a clutch mounted on said shaft and comprising coöperating members, one of which is provided with an adjustable face plate having a cam, and one of which is movable toward and from the other, means for moving said movable clutch member toward the other, and a device movable toward and from said clutch members and between the same to engage said cam.

In testimony whereof, I have signed my name to this specification in the presence of two subscribing witnesses.

WINN E. BROUGHTON.

Witnesses:
GEORGE H. CAVANAGH,
A. E. McCLURE.

Copies of this patent may be obtained for five cents each, by addressing the "Commissioner of Patents, Washington, D. C."